US006381157B2

United States Patent
Jensen

(10) Patent No.: US 6,381,157 B2
(45) Date of Patent: Apr. 30, 2002

(54) INDEPENDENT LOAD SHARING BETWEEN PARALLEL INVERTER UNITS IN AN AC POWER SYSTEM

(75) Inventor: Uffe Borup Jensen, Odense (DK)

(73) Assignee: Axel Akerman A/S (DK)

( * ) Notice: Subject to any disclaimer, the term of this patent is extended or adjusted under 35 U.S.C. 154(b) by 0 days.

(21) Appl. No.: 09/755,993

(22) Filed: Jan. 5, 2001

(30) Foreign Application Priority Data

Jan. 6, 2000 (DK) .......................................... 2000 00007

(51) Int. Cl.[7] .............................. H02M 7/00; H02M 3/24
(52) U.S. Cl. ................................ 363/71; 363/65; 363/95
(58) Field of Search ........................... 363/131, 71, 65, 363/95, 97

(56) References Cited

U.S. PATENT DOCUMENTS

| 4,062,057 | A | * | 12/1977 | Perkins et al. ................. 363/71 |
| 4,149,233 | A | * | 4/1979 | Nagano ......................... 363/71 |
| 5,001,619 | A | | 3/1991 | Nakajima et al. .............. 363/41 |
| 5,191,519 | A | * | 3/1993 | Kawakami ..................... 363/71 |
| 5,377,092 | A | | 12/1994 | Rowand, Jr. et al. ......... 363/41 |
| 5,383,107 | A | | 1/1995 | Hopkins et al. ............... 363/41 |
| 5,436,512 | A | * | 7/1995 | Inam et al. .................... 307/58 |
| 5,745,356 | A | | 4/1998 | Tassitino, Jr. et al. ........ 363/71 |
| 6,118,680 | A | | 9/2000 | Wallace et al. ................ 363/71 |
| 6,154,383 | A | * | 11/2000 | Cardwell, Jr. ................. 363/71 |
| 6,201,723 | B1 | * | 3/2001 | Farrington .................... 363/147 |

* cited by examiner

Primary Examiner—Bao Q. Vu
(74) Attorney, Agent, or Firm—Thompson Hine LLP

(57) ABSTRACT

For independent load sharing of current harmonics between parallel inverter units (1a, 1b, 1c) in an AC power system without intra-unit control signal communication, where each inverter unit is connected to a common load (8) through a separate impedance (7a, 7b, 7c), amplitude and phase of a selected current harmonic is determined for each unit by processing of a current value M measured in a power output line (51a, 51b, 51c) from the unit before the separate impedance and is compared with amplitude and phase of a feed-back voltage or current (V) from the power output line to produce an error signal, which is used for determination of a control signal component for the selected harmonic for incorporation into a control signal input to control means for controlling the content of said harmonic in the voltage and/or current supplied by the inverter unit (1a, 1b, 1c) to the common load (8).

29 Claims, 5 Drawing Sheets

INDEPENDENT LOAD SHARING BETWEEN PARALLEL INVERTER UNITS IN AN AC POWER SYSTEM

The present invention relates to a method for independent load sharing of current harmonics between parallel inverter units in an AC power system and an AC power system comprising a number of inverter units connected in parallel with a common load without intra-unit control signal communication.

In AC power systems of this kind use is typically made of inverter units that controlled by pulse width modulation can supply a filtered output voltage to the load, in which both fundamental frequency and harmonics can be controlled.

AC power systems comprising a number of such inverter units connected in parallel are known in the art and may be used as redundant power supply systems in applications, where maintenance of electrical power supply is critical, such as electrical power supply in computer systems, aircraft, radar installations, hospital systems and similar applications. Typically, the redundancy of such systems will be provided by the use of two or more units for continued supply of the common load in situations of failure or fall-out of a unit, whereby power supply to the load is maintained by the remaining unit or units.

In other applications of AC power systems parallel connection of inverter units may be necessary to maintain a desired power supply capacity.

In U.S. Pat. No. 5,745,356 a parallel redundant power supply system without use of intra-unit signaling is disclosed, in which the information necessary for load sharing is derived solely from the output power level of each unit, whereby the output of a unit is phase-locked to the output of other units connected in parallel therewith. Power level samples are generated either from a DC input voltage from the DC input power source or the AC output voltage from AC output voltage generating means and used for determination of the AC output power by control of the AC output phase and frequency by a control signal determined by integration of a derivative of the output power level of the AC output voltage generating means as obtained from the power level samples.

In such a system distribution of load current harmonics between the individual inverter units is not possible.

In installations, however, requiring electrical power supply of non-linear loads, typically a load consisting entirely or partly of rectifiers, e.g. diode or thyristor rectifiers, such as computer aircraft and radar installations sharing of load current harmonics between inverter units is critical. A rectifier load causes distortion of the current supplied by an inverter and, in result, the load current will have a content of harmonics in addition to the fundamental frequency. If such current harmonics are not distributed evenly between the inverters there will be a risk of overloading of the individual inverter and, in result a reduction of its life time.

In U.S. Pat. No. 5,436,512 a method for active sharing of a harmonic load between inverters connected in parallel is disclosed. This method requires electrical connection between the inverter units in addition to their common connection to the load. Beyond adding complication and expense such a solution may create problems with respect to reliability and will not be suitable for use in a distributed system with individual inverters placed geographically apart from each other.

For single inverter units supplying an output voltage which becomes distorted to an unacceptable extent by load current harmonics various methods for active limitation or reduction of the distortion, e.g. by use of the dynamics of the inverter to compensate for the distortion, have been disclosed in the art. Thus, U.S. Pat. No. 5,001,619 and U.S. Pat. No. 5,377,092 discloses methods, by which amplitude and phase relationship for a single harmonic is determined by discrete Fourier transformation. A vector representing the amplitude and phase shift of the harmonic is used as input to an integrating control unit to produce an integrated reference quantity, which is transformed back to the time domain by inverse discrete Fourier transformation and added to the control reference for the inverter. Thereby, the inverter is controlled to compensate for a load current harmonic such that the output voltage is not significantly distorted, even by a non-linear load.

In U.S. Pat. No. 5,383,107 an inverter control unit is disclosed in which a complex objective function based upon harmonic content in a minimum number of the phase-to-phase AC voltages produced by the inverter, e.g. two out of the three phase-to-phase voltages, is determined to control the switches of the inverter to minimize the objective function and thus control the harmonic content in the inverter output voltages.

In general, these prior art methods for reduction of distortion cannot be applied to a system of several inverters connected in parallel. Thus, in compensation methods a fatal situation may arise, when two or more inverter units counteract each other, e.g. by an inverter unit generating a compensating voltage harmonic, which another inverter unit will try to remove. In result circulating current harmonics may flow from one inverter unit to the other and, not only from an inverter unit to the load as desired. Such circulating currents will cause increasing loss and a reduction of the overall capacity made available to the load.

On this background it is the object of the invention to provide a method and an AC power system of the kind set forth, which will provide active load sharing of current harmonics between inverters connected in parallel.

According to the invention this object is achieved by a method for independent load sharing of current harmonics between parallel inverter units in an AC power system without intra-unit control signal communication, each of said inverter units comprising a DC to AC converter means with associated control means for controlling switching times of said converter means and each being connected to a common load through a separate impedance, said method comprising for each of said units the steps of measuring at least a current in a power output line from the unit before said separate impedance, processing the measured current value for determination of amplitude and phase of a selected current harmonic, comparing the amplitude and phase of the selected current harmonic with amplitude and phase of a feed-back voltage or current from said power output line to produce an error signal and using said error signal for determination of a control signal component for the selected harmonic for incorporation into a control signal input to said control means for controlling the content of said harmonic in the voltage and/or current supplied by the inverter unit to the common load via said separate impedance.

The method according to the invention may be applied to control of one or more harmonics in the inverter output voltage by determination of a control signal component for each such harmonic, the control signal component being variable from zero to a value determined by the measured current harmonic.

For each inverter unit the control signal component may be determined by methods as disclosed in the art, e.g. in U.S. Pat. No. 5,001,619 and U.S. Pat. No. 5,377,092 mentioned above.

Thus, by the method according to the invention the reference signal for the inverter control unit is modified to adapt the selected output voltage harmonic to the current in a way so as to avoid circulating currents between individual inverter units and, provide equal sharing of load current harmonics between the individual inverter units.

Preferred implementations of the method are stated in dependent claims 2 to 8.

Further in accordance with the invention an AC power system is provided, comprising a number of inverter units connected in parallel with a common load without intra-unit control signal communication, each of said inverter units comprising a DC to AC converter means with associated control means for controlling switching times of said converter means and each being connected to the common load through a separate impedance, each of said inverter units further comprising means for measuring at least a current in a power output line from the unit before said separate impedance, means for processing the measured current value for determination of amplitude and phase of a selected current harmonic, means for comparing the amplitude and phase of the selected current harmonic with amplitude and phase of a feed-back voltage or current from said power output line to produce an error signal and means for determination from said error signal of a control signal component for the selected harmonic for incorporation into a control signal input to said control means for controlling the content of said harmonic in the voltage and/or current supplied by the inverter unit to the common load via said separate impedance.

Preferred and advantageous embodiments of such a power system are stated in dependent claim 10 to 14.

Application of the method and AC power system of the invention is not limited to any particular type or number of inverter units, nor to the number of output voltage phases or any particular method for determination and control of current and/or voltage harmonics.

In the following the invention will be described in more detail with reference to the accompanying schematical drawings, in which FIG. 1 is a block diagram of an AC power system comprising three inverter units in a parallel arrangement connected to a common load;

Figure 1:
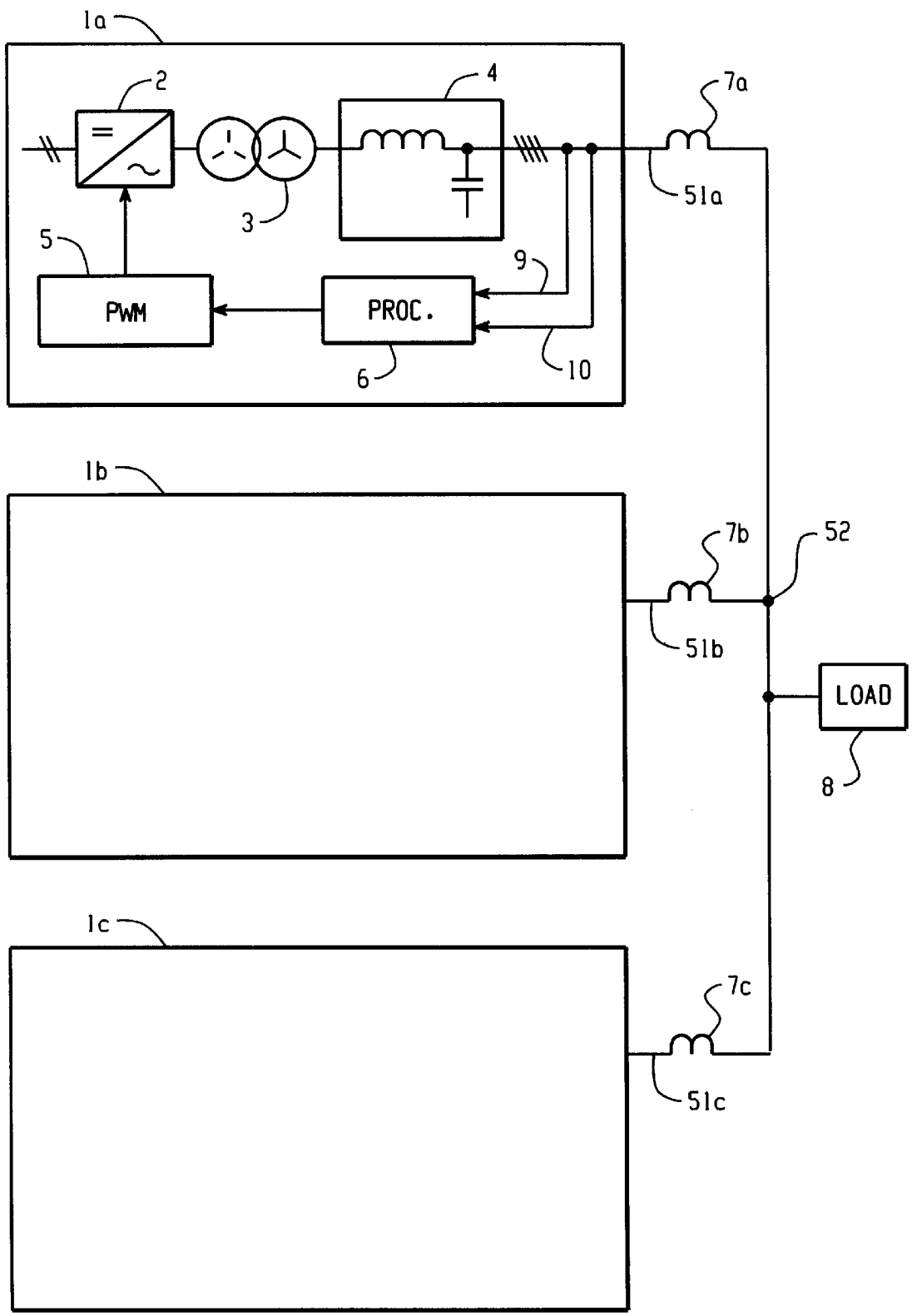

In the AC power system shown in FIG. 1 each of three inverter units 1a, 1b and 1c connected in a parallel coupling comprises an inverter bridge 2, which is supplied with a DC voltage. The inverter bridge 2 feeds a three-phase transformer 3, the output voltages of which are supplied to an output filter 4, e.g. of LC type, attenuating the high frequency content in the voltages from the inverter bridge 2.

The output lines 51a to 51c from the filters 4 of the individual inverters 1a to 1c are connected via separate impedances 7a, 7b and 7c and a common junction 52 to the common load 8. The separate impedances, each of which may as shown comprise a coil or could alternatively consist of a piece of cable, are necessary for the individual control of the output voltage from each of inverter units 1a to 1c.

As shown for inverter unit 1a only, the voltage and current in the output line 51a after the filter 4 are measured and the measured values of the voltage V and the current I are supplied via lines 9 and 10 to a processing unit 6 for determination of a control signal component, which is supplied to a pulse width modulator 5 acting as a control unit for controlling switching instants of the inverter bridge 2.

In the following the processing unit 6 and the determination of the control signal component for a single phase and a single harmonic will be explained in more detail with reference to FIGS. 2 to 4.

Figure 2:
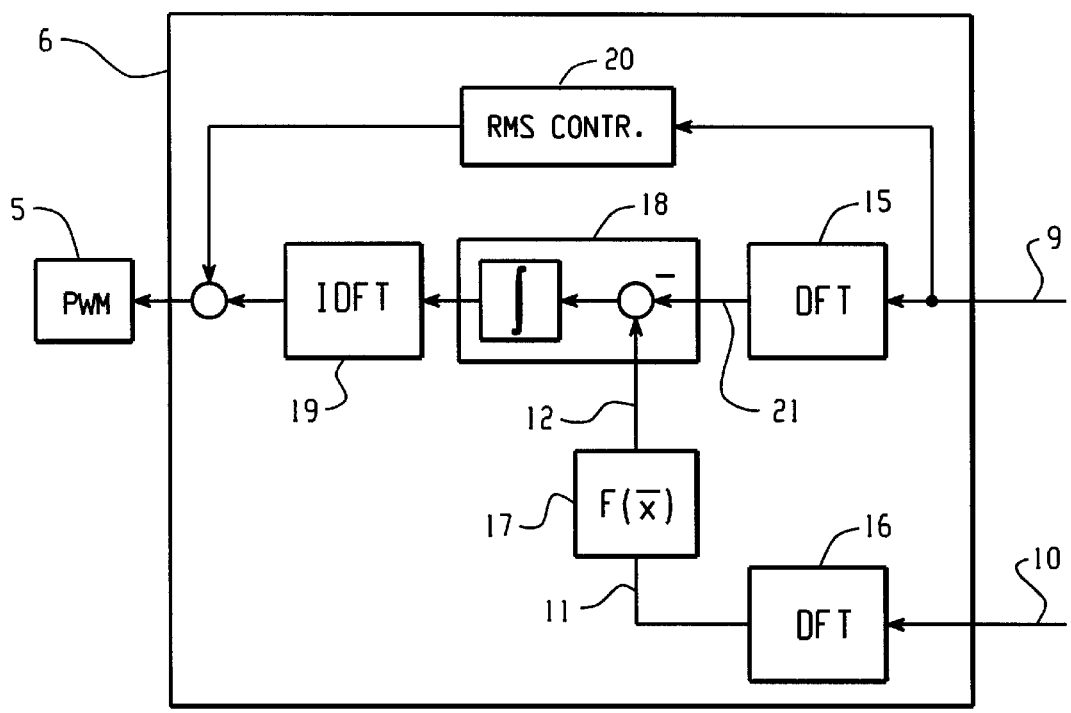
FIG. 2 is a block diagram of an inverter unit in the system shown in FIG. 1 with control means embodying the invention.
Figure 3:
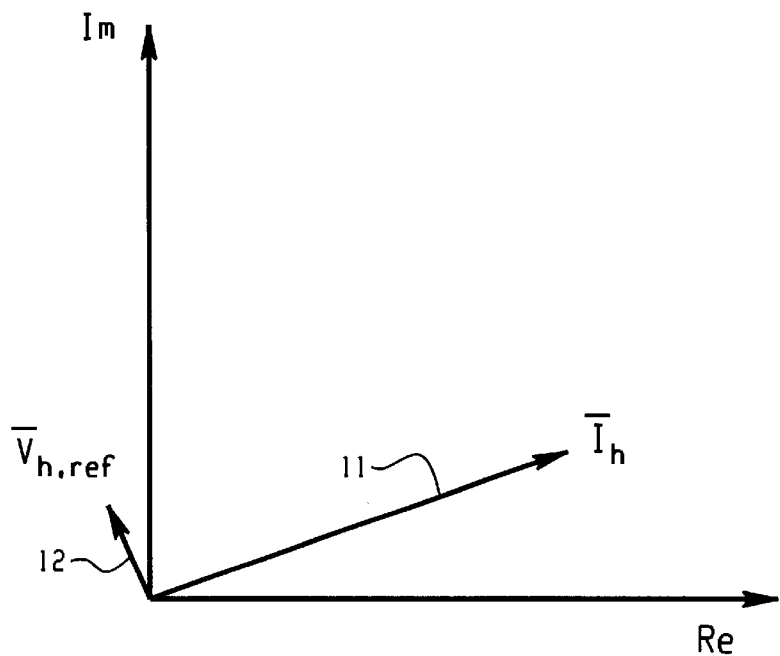
FIG. 3 is a graphic vector representation of a current harmonic and a corresponding reference voltage component.

As shown in FIG. 2 the measured value of the current I supplied via line 10 is subjected in a block 16 to a discrete Fourier transformation DFT, as a result of which calculation is made of the real and imaginary components $Re(\bar{I}_h)$ and $Im(\bar{I}_h)$ of a selected current harmonic $\bar{I}_h$ as shown by the vector representation 11 in FIG. 3.

Figure 4:
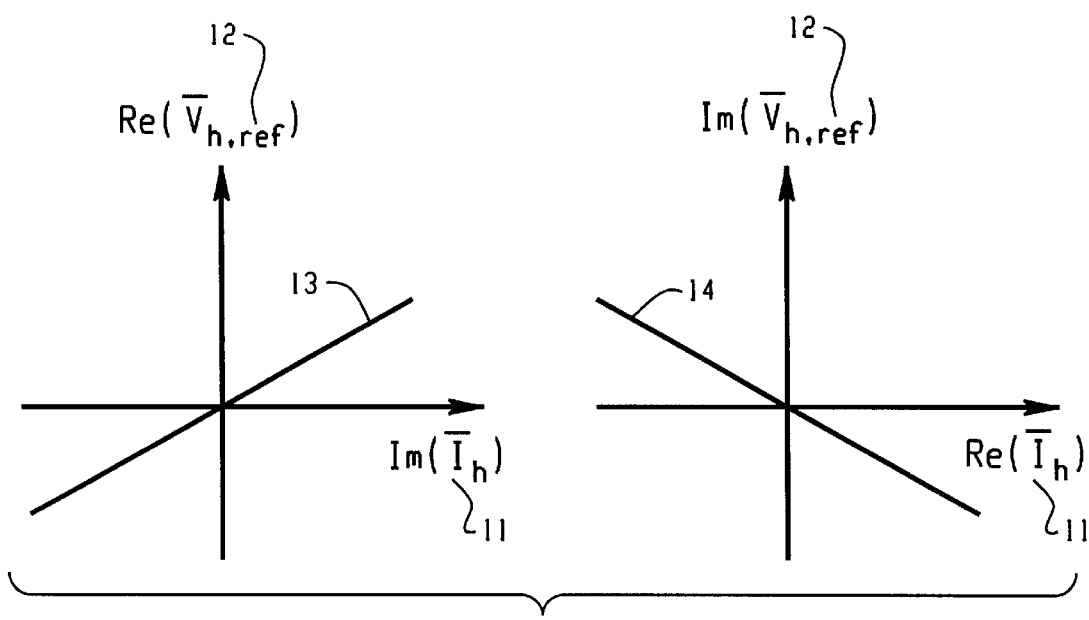
FIG. 4 is an illustration of the relationship between real and imaginary components of the vectors represented in FIG. 3.

As functions of the real and imaginary components $Re(\bar{I}_h)$ and $Im(\bar{I}_h)$ of the current harmonic $I_h$ real and imaginary components $Re(V_{h,ref})$ and $Im(V_{h,ref})$ of a reference signal component which is calculated in a processing block 17, as illustrated by the graphic representation in FIG. 4, in accordance with the equations $$Re(V_{h,ref}) = K_h\, Im(\bar{I}_h);\text{ and}$$

$$Im(V_{h,ref}) = -K_h\, Re(\bar{I}_h)$$

where $K_h$ is a factor representing a proportional relationship between the calculated current harmonic Ih obtained from DFT block 16 and the corresponding reference signal component $V_h$ for the selected harmonic.

As result of these calculation a reference signal component $V_{h,ref}$ is calculated as shown by the vector representation 12 in FIG. 3. In the example illustrated by the equations above and the graphic representations in FIGS. 3 and 4 a linear or proportional amplitude relationship and a phase relationship corresponding to a phase difference of 90° has been chosen as a preferred relationship. However, within the scope of the invention arbitrary phase and amplitude relationship may be used.

As further shown in FIG. 2 also the measured value V supplied via line 9 is subjected in the processing unit 6 to a discrete Fourier transformation DFT in a block 15, as a result of which a voltage harmonic vector representation 21 is calculated. The vector 21 for the voltage harmonic forms part of a feed-back signal to the processing unit 6. The vector 21 representing the feed-back voltage harmonic is now in a regulator block 18 subtracted from the vector 12 representing the reference signal component to form an error signal vector which is supplied to an I or PI integrator, from which the integrated error signal is transformed back to the time domain by an inverse discrete Fourier transformation IDFT in a block 19 to form a control voltage harmonic, which is added to a feed-back signal supplied from an RMS control block 20 for control of the fundamental frequency of the output signal to form the overall control signal to be supplied to the PWM modulator 5 in FIG. 1.

Figure 5:
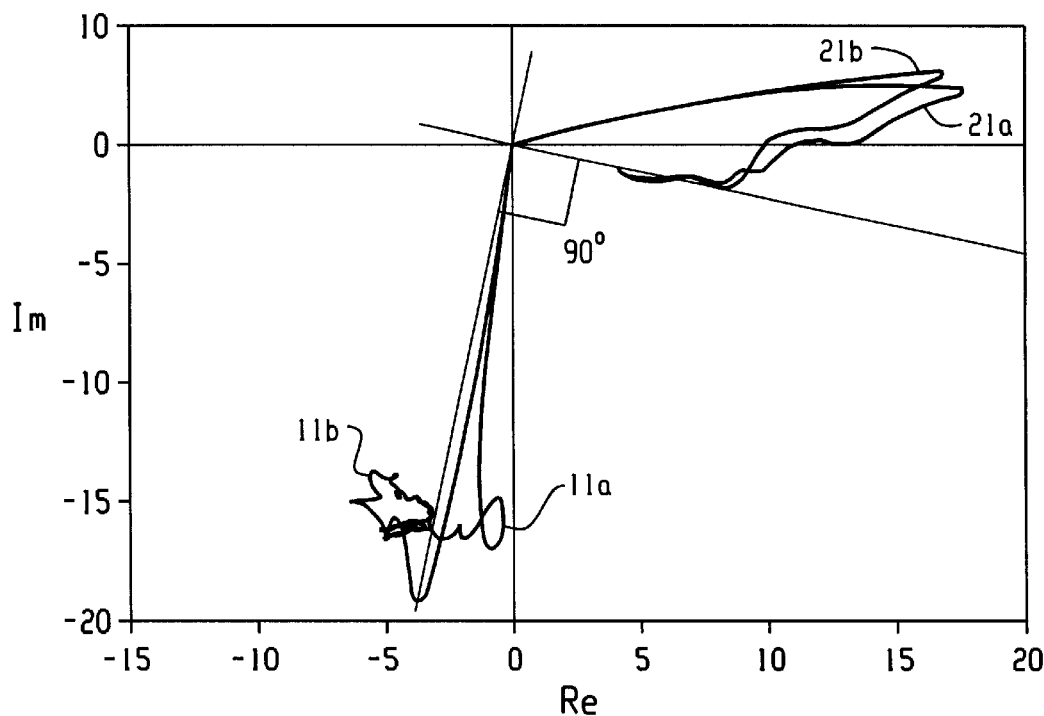
FIG. 5 is an example of a graphic transient signal waveform representation by use of the method according to the invention.

In accordance with the example described above the graphic representation in FIG. 5 illustrates transient phenomena for the 5th harmonic from two inverter units connected in parallel such as inverter units 1a and 1b in FIG. 1 represented by current harmonic vectors 11a and 11b and output or feedback voltage harmonic vectors 21a and 21b. As will appear the current harmonics from the two inverters are shared during the transient situation and shared with high accuracy in the stationary situation, whereby a significant reduction of distortion in the output is obtained. This results from the described phase and amplitude relationship, by which the voltage harmonic vectors 11a and 11b are controlled to be phase-shifted 90° in front of the current harmonic vectors, as represented by vectors 21a and 21b with an amplitude proportional to the amplitude of the current harmonic vectors.

Figure 6:
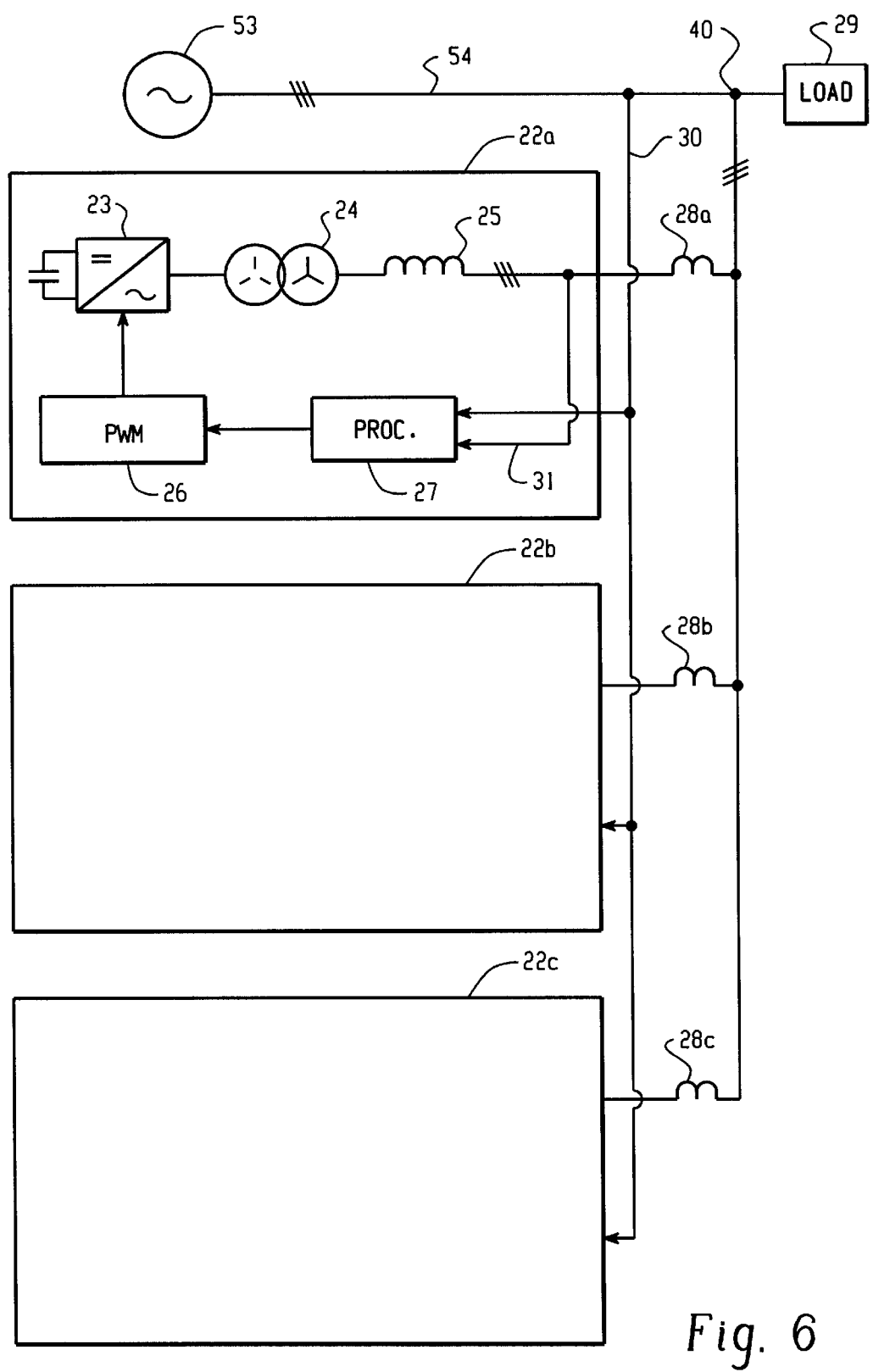
FIG. 6 is a block diagram of a further embodiment of a load sharing AC power system according to the invention with means for compensation of current harmonics.

In FIG. 6 an alternative embodiment is shown to illustrate application of the invention to active compensation of harmonics in a load current by means of a parallel arrangement of inverter units. In case of a non-linear load 29 the supply voltage from an AC voltage source 53 is distorted. This distortion is avoided by injection of current harmonics in counterphase to the load current harmonics. Without the measures of the invention parallel coupling of inverter units for such a purpose without intra-unit communication would lead to a fatal situation, in which circulating currents between the units cannot be avoided. By application of the invention the load current is shared between the inverter units without any need of communication between the units.

In the arrangement in FIG. 6 three inverter units 22a, 22b and 22c are connected in parallel, each of which comprises an inverter bridge 23 supplying a three-phase transformer 24, the output currents of which are supplied to an output filter 25, which may be of L-type for damping of the current ripple. In line 54 connecting the load 29 with the AC source 53 the load current is measured and the measured current value is supplied via line 30 to the control unit 27 together with the measured current from output filter 25 supplied via line 31 for determination of the reference signal component for the PWM modulator 26, which calculates the switching instants of the inverter bridge.

As in the arrangement in FIG. 1 each of inverter units 22a to 22c are connected with the load through a separate impedance, e.g. in the form of a coil 28a, 28b and 28c, respectively, or alternatively a piece of cable, and a common junction 40.

Figure 7:
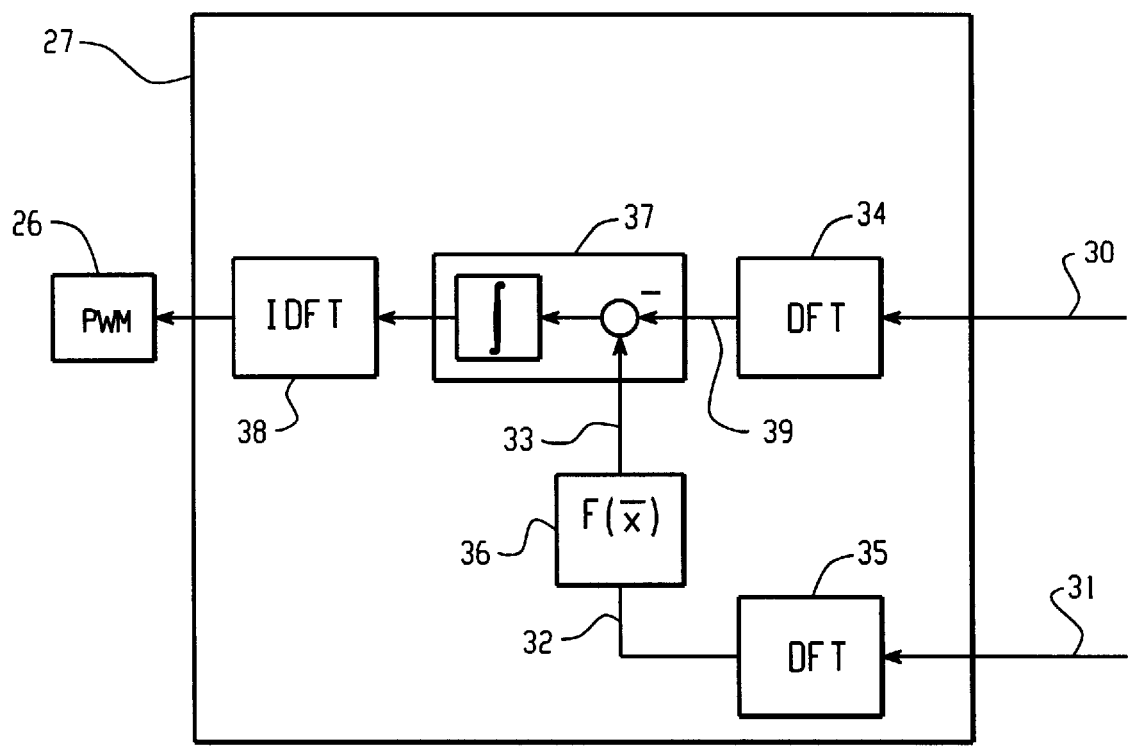
FIG. 7 is a block diagram of an inverter unit, on the system shown in FIG. 6 with control means embodying the invention.

In FIG. 7 the control unit 27 is shown in greater detail with respect to its operation for a single phase and a single harmonic. As explained above with reference to FIG. 2 a current harmonic vector 32 is calculated by discrete Fourier transformation, DFT in a block 35 and is converted in the block 36 to a reference signal component for the selected harmonic, which is supplied to the regulator block 37.

From the measured load current value supplied via line 30 and representing a feed-back signal for regulator unit 37 a current harmonic vector 39 is determined by discrete Fourier transformation, DFT in a block 34.

In the regulator 37 an error vector is determined as the vector difference between the measured and feed-back current harmonic vectors 33 and 39 and is inputted to an I or PI integrator supplying an integrated error signal, which is transformed back to the time domain by inverse discrete Fourier transformation, IDFT in a block 38, from which the control voltage harmonic is supplied to the PWM modulator 26.

Whereas the method and AC power system of the invention have been explained with reference to specific embodiments in hardware implementation it will be appreciated by persons skilled in the art that within the scope of the invention many deviations will be possible including, in particular, software implementation of the processing steps conducted in the inverter units for determination of a control signal harmonic to influence the PWM control of an inverter bridge.

What is claimed is:

1. A method for independent load sharing of current harmonics between parallel inverter units (1a, 1b, 1c; 22a, 22b, 22c) in an AC power system without intra-unit control signal communication, each of said inverter units comprising a DC to AC converter means (2; 23) with associated control means (5; 26) for controlling switching times of said converter means and each being connected to a common load (8; 29) through a separate impedance (7a, 7b, 7c; 28a, 28b, 28c), said method comprising for each of said units the steps of measuring at least a current in a power output line (51a, 51b, 51c) from the unit before said separate impedance, processing the measured current value for determination of amplitude and phase of a reference signal component ($V_h$) corresponding to a selected harmonic ($I_h$) of said measured current, comparing the amplitude and phase of said reference signal component with amplitude and phase of a feed-back voltage or current (V) from said power output line to produce an error signal and using said error signal for determination of a control signal component for the selected harmonic for incorporation into a control signal input to said control means (5; 26) for controlling the content of said harmonic in the voltage and/or current supplied by the inverter unit (1a, 1b, 1c; 22a, 22b, 22c) to the common load (8; 29) via said separate impedance (7a, 7b, 7c; 28a, 28b, 28c).

2. A method as claimed in claim 1, wherein said control means (5) is controlled to supply a PWM control signal for said converter means.

3. A method as claimed in claim 2, wherein said determination of amplitude and phase of a reference signal is made at least in part by a discrete Fourier transformation.

4. A method as claimed in claim 2, wherein said control signal component is determined to include a phase and amplitude relationship with respect to the selected harmonic.

5. A method as claimed in claim 4, wherein said control signal component is determined to include a phase difference of 90° and a linear amplitude relationship with respect to the selected harmonic.

6. A method as claimed in claim 1, wherein the determination of said control signal component comprises integration of said error signal and back-transformation of the integrated signal to a time domain.

7. A method as claimed in claim 1, wherein said feed-back signal is obtained by measuring a voltage in said power output line (51a, 51b, 51c) from said inverter unit (1a, 1b, 1c).

8. A method as claimed in claim 1, wherein said inverter units (22a, 22b, 22c) are controlled to provide active compensation of load current harmonics by injection of compensating current components into the load current lines (54) and said feed-back signal is obtained by measuring said load current.

9. An AC power system comprising a number of inverter units (1a, 1b, 1c; 22a, 22b, 22c) connected in parallel with a common load (8; 29) without intra-unit control signal communication, each of said inverter units (1a, 1b, 1c; 22a, 22b, 22c) comprising a DC to AC converter means (2;23) with associated control means (5;26) for controlling switching times of said converter means and each being connected to the common load through a separate impedance (7a, 7b, 7c; 28a, 28b, 28c), each of said inverter units further comprising means for measuring at least a current in a power output line (51a, 51b, 51c) from the unit before said separate impedance, means for processing the measured current value for determination of amplitude and phase of a reference signal component ($V_h$) corresponding to a selected harmonic ($I_h$) of said measured current, means for comparing the amplitude and phase of said reference signal component with amplitude and phase of a feed-back voltage or current from said power output line to produce an error signal and means (18, 19) for determination from said error signal of a control signal component for the selected harmonic for incorporation into a control signal input to said control means (5; 26) for controlling the content of said harmonic in the voltage and/or current supplied by the inverter unit (1a, 1b, 1c; 22a, 22b, 22c) to the common load (8; 29) via said separate impedance.

10. An AC power system as claimed in claim 9, said control means (5;26) comprises PWM control means.

11. An AC power system as claimed in claim 10, wherein said processing means comprises discrete Fourier transformation means.

12. An AC power system as claimed in claim 9, wherein said determination means comprises integrating means (18) for integration of said error signal and inverse discrete Fourier transformation means (19) for back-transformation of the integrated signal to a time domain.

13. An AC power system as claimed in claim 9, wherein said measuring means comprises means for measuring a voltage in said power output line (51a, 51b, 51c) from said inverter unit (1a, 1b, 1c) to provide said feed-back error signal.

14. An AC power system as claimed in claim 9, further comprising means for controlling said control means to provide active compensation of load current harmonics by injection of compensating current components into the load current lines (54), said measuring means comprising means for measuring said load current to provide said feed-back error signal.

15. A method for independent load sharing of current harmonics between parallel inverter units in an AC power system without intra-unit control signal communication, each of said inverter units comprising a DC to AC converter controlled by an output of a switching control circuit and each being connected to a common load through a separate impedance, said method comprising for each of said units the steps of:

measuring at least a current in a power output line from the unit before said separate impedance;

processing the measured current value for determination of amplitude and phase of a selected current harmonic;

processing the determined phase and amplitude of the selected current harmonic to produce a reference signal having a defined amplitude relationship and a defined phase relationship relative to the selected current harmonic;

comparing the amplitude and phase of the reference signal with amplitude and phase of a feed-back voltage or current from said power output line to produce an error signal; and using said error signal for determination of a control signal component for the selected current harmonic for incorporation into a control signal input to said switching control circuit for controlling the content of said current harmonic in the voltage and/or current supplied by the inverter unit to the common load via said separate impedance.

16. A method as claimed in claim 15, wherein said switching control circuit of each inverter is controlled to supply a PWM control signal for said converter.

17. A method as claimed in claim 16, wherein said determination of amplitude and phase of a selected current harmonic is made by a discrete Fourier transformation.

18. A method as claimed in claim 15, wherein said reference signal is determined to include a phase difference of 90° and a linear amplitude relationship with respect to the selected current harmonic.

19. A method as claimed in claim 15, wherein the determination of said control signal component comprises integration of said error signal and back-transformation of the integrated signal to a time domain.

20. A method as claimed in claim 15, wherein said feed-back signal is obtained by measuring a voltage in said power output line from said inverter unit.

21. A method as claimed in claim 15, wherein said inverter units are controlled to provide active compensation of load current harmonics by injection of compensating current components into load current lines and said feed-back signal is obtained by measuring said load current.

22. An AC power system comprising a number of inverter units connected in parallel with a common load without intra-unit control signal communication, each of said inverter units comprising a DC to AC converter controlled by an output of a switching control circuit and each being connected to the common load through a separate impedance, each of said inverter units further comprising a feedback line for measuring at least a current in a power output line from the unit before said separate impedance, a phase and amplitude processor for determination of amplitude and phase of a selected current harmonic of the measured current, a reference signal processor for receiving the determined phase and amplitude of the selected current harmonic and producing a reference signal having a defined amplitude relationship and a defined phase relationship relative to the selected current harmonic, a comparator which compares the amplitude and phase of the reference signal with amplitude and phase of a feed-back voltage or current from said power output line to produce an error signal, and a control signal processor for determining from said error signal a control signal component for the selected harmonic for incorporation into a control signal input to said switching control circuit for controlling the content of said harmonic in the voltage and/or current supplied by the inverter unit to the common load via said separate impedance.

23. An AC power system as claimed in claim 22, said switching control circuit comprises a PWM control circuit.

24. An AC power system as claimed in claim 22, wherein said phase and amplitude processor comprises a discrete Fourier transformation processor.

25. An AC power system as claimed in claim 22, wherein said control signal processor comprises an integrator portion which integrates said error signal and inverse discrete Fourier transformation portion for back-transformation of the integrated signal to a time domain.

26. An AC power system as claimed in claim 22, further comprising a feedback line for measuring a voltage in said power output line from said inverter which is provided to said comparator.

27. An AC power system as claimed in claim 22, further comprising a processor for controlling said switching control circuit to provide active compensation of load current harmonics by injection of compensating current components into the load current lines.

28. A method for independent load sharing of current harmonics between parallel inverter units in an AC power system without intra-unit control signal communication, each of said inverter units comprising a DC to AC converter controlled by an output of a switching control circuit and each being connected to a common load through a separate impedance, said method comprising for each of said units the steps of:

measuring at least a current in a power output line from the unit before said separate impedance;

processing the measured current value for determination of amplitude and phase of a reference signal corresponding to a selected harmonic of the measured current;

comparing the amplitude and phase of the reference signal with amplitude and phase of a feed-back voltage or current from said power output line to produce an error signal; and using said error signal for determination of a control signal component for the selected current harmonic for incorporation into a control signal input to said switching control circuit for controlling the content of said current harmonic in the voltage and/or current supplied by the inverter unit to the common load via said separate impedance.

29. An AC power system comprising a number of inverter units connected in parallel with a common load without intra-unit control signal communication, each of said inverter units comprising a DC to AC converter controlled by an output of a switching control circuit and each being connected to the common load through a separate impedance, each of said inverter units further comprising a feedback line for measuring at least a current in a power output line from the unit before said separate impedance, a processor for determination of amplitude and phase of a reference signal corresponding to a selected harmonic of the measured current, a comparator which compares the amplitude and phase of the reference signal with amplitude and phase of a feed-back voltage or current from said power output line to produce an error signal, and a control signal processor for determining from said error signal a control signal component for the selected harmonic for incorporation into a control signal input to said switching control circuit for controlling the content of said harmonic in the voltage and/or current supplied by the inverter unit to the common load via said separate impedance.

* * * * *